J. Strauss,
Wine Filter.
No. 109,467. Patented Nov. 22, 1870.
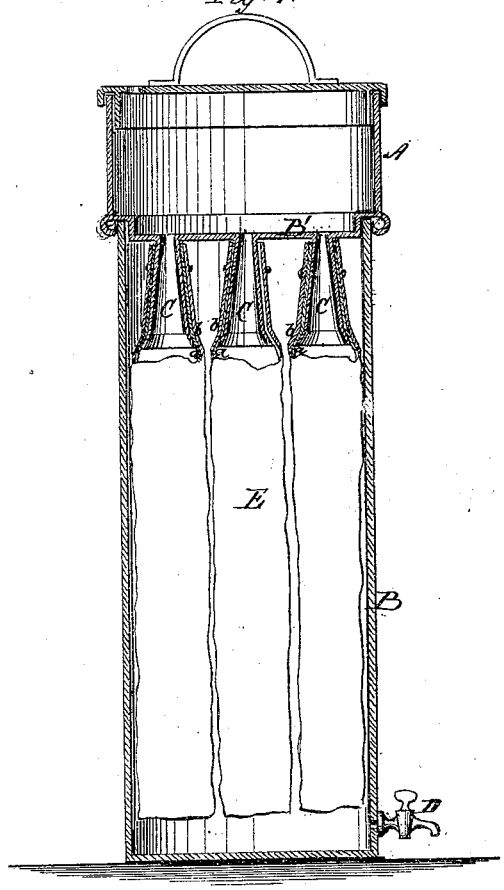
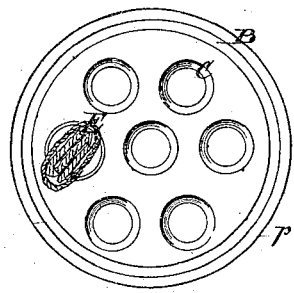
Witnesses  
L. S. Mgatee  
Alex. F. Roberts
Inventor:  
J. Strauss  
pr Munn & Co  
Attorneys

United States Patent Office.

JULIUS STRAUSS, OF NEW YORK, N. Y.

Letters Patent No. 109,467, dated November 22, 1870.

IMPROVEMENT IN FILTERS FOR WINES, SIRUPS, &c.

The Schedule referred to in these Letters Patent and making part of the same.

*To all whom it may concern:*

Be it known that I, JULIUS STRAUSS, of the city of New York, in the county and State of New York, have invented a new and improved Wine and Liquor Filter; and I do hereby declare that the following is a full, clear, and exact description thereof, which will enable others skilled in the art to make and use the same, reference being had to the accompanying drawing forming part of this specification.

This invention relates to improvements in filtering and clarifying wine, whisky, and other liquors, and filters therefor, and consists of a cylindrical vessel, preferably made in two parts, one considerably shorter than the other, and having a perforated bottom with one or more nozzles projecting downward from it, into which the holes discharge, said parts connecting with the other, which serves mainly as a stand, so as to be readily disconnected, and the nozzles, having filtering bags or sacks attached for reception of the wine, which, having pounded charcoal previously mixed with it, is poured into the upper vessel and allowed to percolate through the sack, all as hereafter described.

Figure 1 is a sectional elevation of my improved wine-filter, and

Figure 2 is a bottom view of the same.

A is the upper part, and B the lower part of the vessel, which may be made of tin or any other sheet or cast metal.

The part A fits into the other snugly, and has a perforated bottom, B', on the lower side of which are the nozzles C, attached so that the holes lead into them, and they are enlarged toward the lower ends to facilitate the holding of filtering sacks, E, which are to be tied to them, as shown, one to each.

Each sack is composed of an inner cloth, *a*, of muslin, and an outer one, *b*, of linen, the muslin being made considerably broader than the other, and folded as shown in fig. 2.

The wine, whisky, or other liquors to be filtered, first, having a quantity of finely pulverized charcoal mixed with it, is poured into the part A of the vessel, and allowed to percolate through the sacks to the bottom of part B, from which it is drawn away through the cock D.

The muslin sack, being of a looser texture than the linen, and having loose fibers hanging from the threads, will arrest the coarser particles of matter in the wine, while the closer linen fabric separates the finer particles not taken by the other, thus graduating the operation, which will be more rapid with this arrangement than if the whole be performed by one sack.

For small quantities of wine all the holes but one may be plugged up, so that only one sack need be applied, but when large quantities are to be filtered more sacks may be used.

This mode of filtering is much more economical in respect of the time employed than the common mode, which consists in mixing certain kinds of fish-bladder in a desiccated and pulverized state with the liquor, boiling or heating, and then letting it stand from twelve to twenty-four hours to settle, after which it is drawn off above the settlings.

By this mode the liquor may be drawn off as fast, or nearly so, as it is poured in, and the substances treated are ready for immediate use.

Having thus described my invention,

I claim as new and desire to secure by Letters Patent—

As an improved article of manufacture, the portable filter, A B B' C D E, having sheet-metal case, made in two parts, and detachably connected at the point below the diaphragm, to which the nozzles are connected, to facilitate the removal of the bags for cleaning and changing, all as described.

The above specification of my invention signed by me this 23d day of August, 1870.

JULIUS STRAUSS.

Witnesses:
GEO. W. MABEE,
T. B. MOSHER.